US009395213B2

(12) United States Patent
Jeon et al.

(10) Patent No.: US 9,395,213 B2
(45) Date of Patent: Jul. 19, 2016

(54) SENSOR SIGNAL PROCESSING DEVICE AND READOUT INTEGRATED CIRCUIT INCLUDING THE SAME

(71) Applicant: Electronics and Telecommunications Research Institute, Daejeon (KR)

(72) Inventors: Young-deuk Jeon, Daejeon (KR); Min-Hyung Cho, Daejeon (KR); Yi-Gyeong Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 361 days.

(21) Appl. No.: 14/179,508

(22) Filed: Feb. 12, 2014

(65) Prior Publication Data

US 2015/0002216 A1 Jan. 1, 2015

(30) Foreign Application Priority Data

Jun. 27, 2013 (KR) ........................ 10-2013-0074535

(51) Int. Cl.
*G01V 3/00* (2006.01)
*G01D 5/24* (2006.01)
*G01D 3/036* (2006.01)

(52) U.S. Cl.
CPC ................ *G01D 5/24* (2013.01); *G01D 3/0365* (2013.01)

(58) Field of Classification Search
CPC ..................... H01L 27/14643; H01L 27/0805; H01L 27/14609; H01L 27/14621; H01L 27/14625; H01L 24/14636; G01J 1/46; G01R 29/26; H03M 1/468; H04N 5/3745; H04N 5/378
See application file for complete search history.

(56) References Cited

U.S. PATENT DOCUMENTS

| 5,099,239 A * | 3/1992 | Bruce ................. H01L 27/0805 257/E27.048 |
| 2008/0048997 A1* | 2/2008 | Gillespie ............. G06F 3/03547 345/174 |
| 2008/0128698 A1* | 6/2008 | Martin ................ G03F 7/70433 257/55 |
| 2008/0225140 A1* | 9/2008 | Raynor ................ H04N 5/3745 348/243 |

(Continued)

FOREIGN PATENT DOCUMENTS

KR 10-2001-0019318 A 3/2001

OTHER PUBLICATIONS

Myunglae Lee et al., "Design, Fabrication, and Characterization of a Readout Integrated Circuit (ROIC) for Capacitive MEMS Sensors", IEEE Sensors Conference, 2007, pp. 260-263.

*Primary Examiner* — Kerri McNally
*Assistant Examiner* — Renee Dorsey

(57) ABSTRACT

Provided is a readout integrated circuit including a sensor signal processing unit receiving sensor signals from a plurality of sensors and converting respectively the sensor signals into voltage signals, a signal converting unit respectively converting the voltage signals into digital signals, a digital signal processing unit outputting digital signals processed in response to the voltage signals and a switching control signal, a power supplying unit generating an internal voltage for operating the signal converting unit and the digital signal processing unit, and a reference sensing voltage for operating the sensor signal processing unit, and a switch unit operating in response to the switching control signal, wherein the switch unit includes switches respectively corresponding to the plurality of sensors and a current amount applied to each sensor is adjusted in response to operation times of the switches.

9 Claims, 4 Drawing Sheets

(56) References Cited

U.S. PATENT DOCUMENTS

| | | | |
|---|---|---|---|
| 2008/0251823 A1* | 10/2008 | Lee .................. H01L 27/14634 257/292 |
| 2009/0072120 A1* | 3/2009 | McGarry ............. H04N 5/2353 250/208.1 |
| 2010/0097015 A1* | 4/2010 | Knoedgen ............ G01D 5/2417 318/135 |
| 2011/0255228 A1* | 10/2011 | Kimura .................... G01D 5/24 361/679.01 |
| 2012/0001615 A1* | 1/2012 | Levine .............. H01L 27/14632 324/71.5 |
| 2013/0015867 A1* | 1/2013 | Aras ........................ G06F 3/044 324/684 |
| 2013/0088247 A1* | 4/2013 | Tseng .................... G01L 1/205 324/693 |

* cited by examiner

SENSOR SIGNAL PROCESSING DEVICE AND READOUT INTEGRATED CIRCUIT INCLUDING THE SAME

CROSS-REFERENCE TO RELATED APPLICATIONS

This U.S. non-provisional patent application claims priority under 35 U.S.C. §119 of Korean Patent Application No. 10-2013-0074535, filed on Jun. 2, 2013, the entire contents of which are hereby incorporated by reference.

BACKGROUND OF THE INVENTION

The present invention disclosed herein relates to a sensor signal processing device, and more particularly, to a sensor signal processing device for processing output sensor signals from a plurality of environmental sensors and a readout integrated circuit (ROIC) including the same.

Recently, for a residence or office environment closely related to a daily life environment of a user, an environmental sensor system is more and more required. In particular, the environmental sensor system may detect state information on the atmosphere in response to sensor signals which are sensed by a plurality of environmental sensors.

Typically, a sensor signal sensed by a single environmental sensor may be processed by a single sensor signal processing element. Accordingly, a plurality of sensor signal processing elements are necessary for processing sensor signals from the plurality of environmental sensors. However, as the number of sensor signal processing elements gets increased, a size and power consumption of the entire circuit are also increased.

SUMMARY OF THE INVENTION

The present invention provides a sensor signal processing device for processing sensor signals output from a plurality of environmental sensors by using a single element, and a readout integrated circuit (ROIC) including the same.

Embodiments of the present invention provide readout integrated circuits including: a sensor signal processing unit receiving sensor signals from a plurality of sensors and converting respectively the sensor signals into voltage signals; a signal converting unit respectively converting the voltage signals into digital signals; a digital signal processing unit outputting digital signals processed in response to the voltage signals and a switching control signal; a power supplying unit generating an internal voltage for operating the signal converting unit and the digital signal processing unit, and a reference sensing voltage for operating the sensor signal processing unit; and a switch unit including switches corresponding respectively to the plurality of sensors and adjusting an amount of a current applied to each sensor in response to the switching control signal.

In other embodiments of the present invention, sensor signal processing apparatuses converting a signal of a capacitor sensor into a voltage signal, includes: a first sensing unit connected between the capacitor sensor and a reference terminal and outputting a first voltage signal according to a sensed amount sensed by the capacitor sensor; a second sensing unit connected to the reference terminal and outputting a second voltage signal in response to a reference sensing voltage provided through the reference terminal; and a reference voltage source connected to the reference terminal and generating the reference sensing voltage, wherein the first voltage signal includes a first noise signal generated on the basis of circuit operations of the first sensing unit, the second voltage signal includes a second noise signal generated on the basis of circuit operations of the second sensing unit and compared with the first noise within a predetermined error range.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
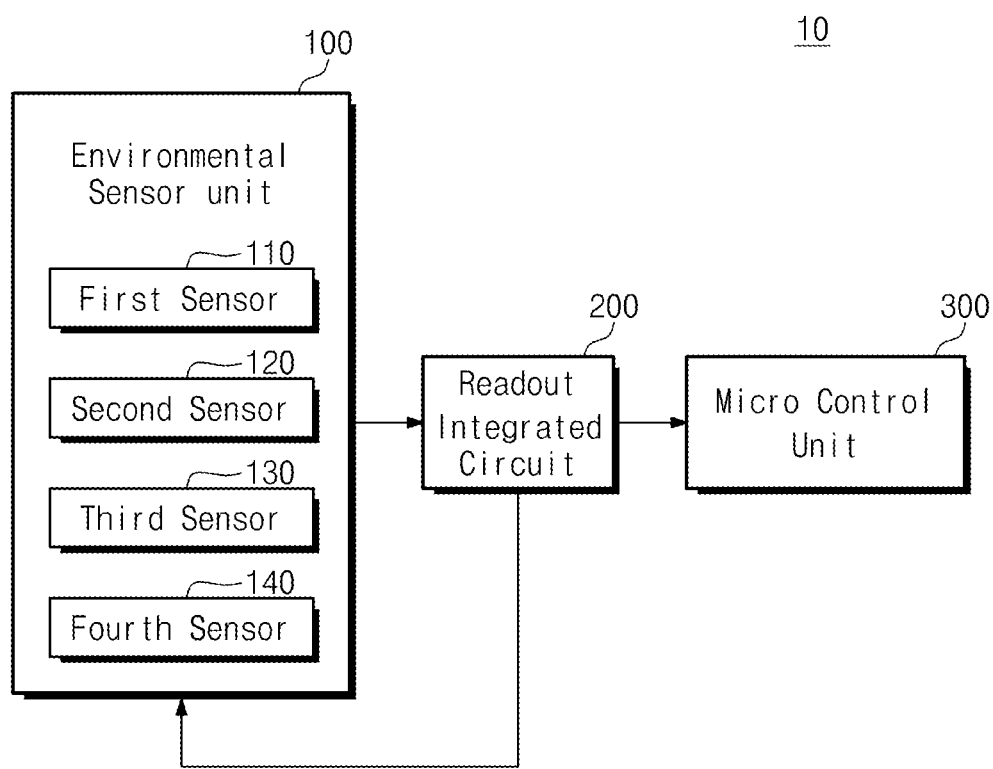
FIG. 1 is a block diagram illustrating an environmental sensor system according to an embodiment of the present invention.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Like reference numerals refer to like elements throughout. A readout integrated circuit (ROIC) and operations performed by it to be described below are to be regarded as merely exemplary, and various changes and modifications of the embodiments described herein can be made without departing from the scope and spirit of the invention.

FIG. 1 is a block diagram illustrating an environmental sensor system according to an embodiment of the present invention. Referring to FIG. 1, the environmental sensor system includes an environmental sensor unit 100, a ROIC 200, and a micro-control unit 300.

The environmental sensor unit 100 includes a first sensor 110, a second sensor 120, a third sensor 130, and a fourth sensor 140. In an embodiment, the environmental sensor unit 100 may be a sensor module capable of detecting atmospheric information such as temperature, humidity, particulate dust, or gas information representing a state of the atmosphere. The environmental sensor unit 100 may include various types of sensors such as a voltage type sensor, a resistor type sensor, a capacitor type sensor, and a potential sensor. The environmental sensor unit 100 transfers signals sensed according to each sensor type to the ROIC 200.

In an embodiment, the first sensor 110 may be implemented with a capacitor type sensor, the second sensor 120 with a resistor type sensor, the third sensor 130 with a potential sensor, and the fourth sensor 140 with a voltage type sensor. In addition, 4 kinds of sensors included in the environmental sensor unit 100 are described, but the sensors are not limited thereto and may further include different types of sensors for detecting the atmospheric information.

The ROIC 200 receives a plurality of sensor signals sensed from the environmental sensor unit 100 and converts the received sensor signals into voltage type signals. The ROIC 200 converts each sensor signal converted into the voltage type signals, into a digital signal. Also, in an embodiment, the ROIC 200 may be fabricated as a readout integrated circuit.

In detail, compared to the existing sensor signal processing scheme which requires one sensor processing element in correspondence to one sensor, the sensor signal processing scheme according to the present invention processes a plurality of sensor signals sensed by a plurality of sensors with one sensor signal processing element. Accordingly, an area and power consumption of the ROIC 200 may be reduced.

The ROIC 200 transfers the digital signals to the micro-control unit 300 according to each sensor signal.

The micro-control unit 300 plays a role of a processor for controlling a system according to the transferred digital signals.

As described above, the environmental sensor system 10 may figure out the atmospheric information on the basis of information sensed by each sensor of the environmental sensor unit 100.

Figure 2:
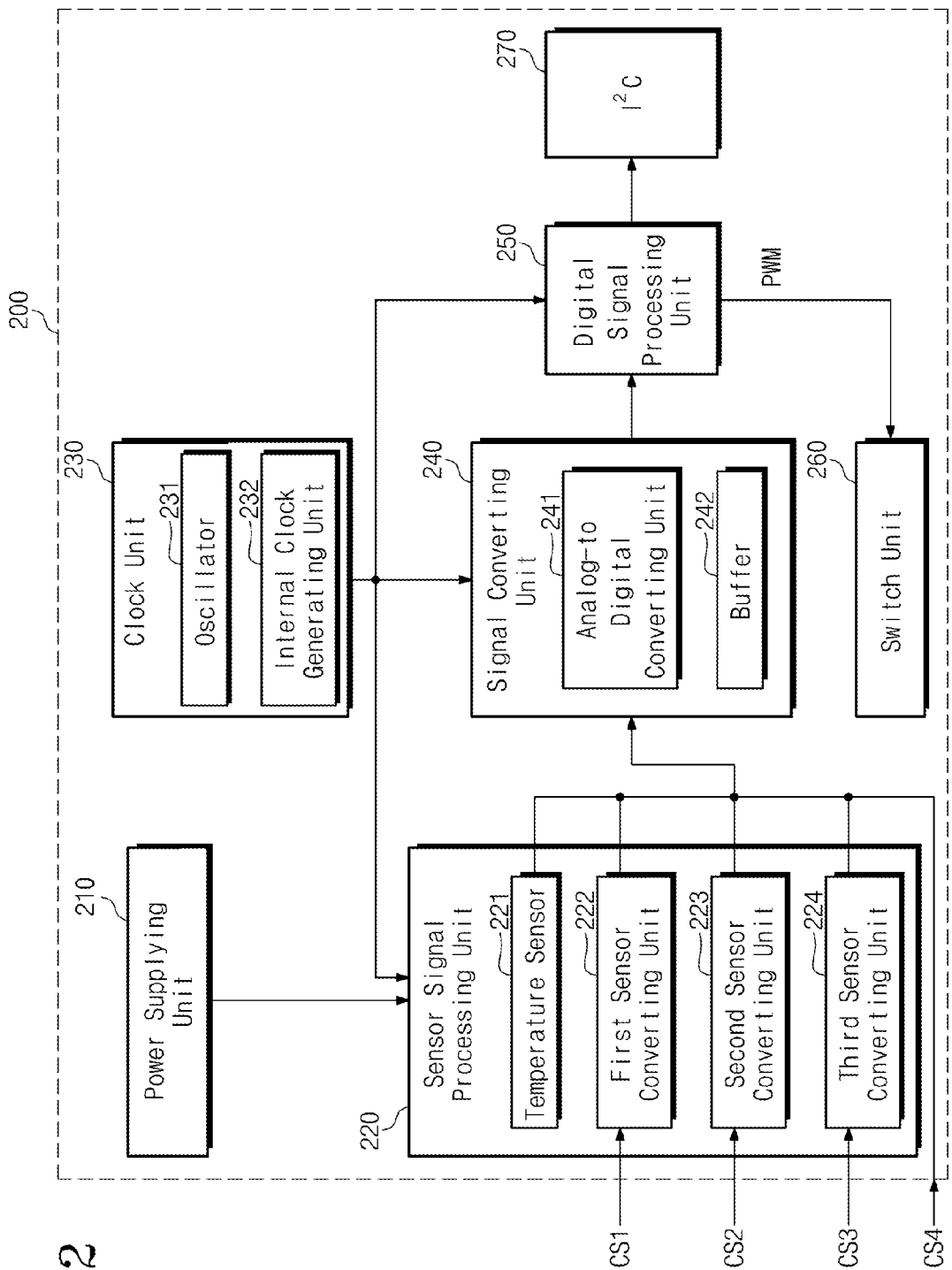
FIG. 2 is a block diagram illustrating a ROIC according to an embodiment of the present invention.

FIG. 2 is a block diagram illustrating a ROIC 200 according to an embodiment of the present invention. Referring to FIGS. 1 and 2, the ROIC 200 includes a power supplying unit 210, a sensor signal processing unit 220, a clock unit 230, a signal converting unit 240, a digital signal processing unit 250, a switch unit 260, and an inter-integrated circuit (I²C) 270.

The power supplying unit 210 generates a reference voltage necessary for driving the ROIC 200 in response to a power supplying voltage received from the outside.

Also, the power supplying unit 210 may generate an internal voltage to be provided to an internal circuit on the basis of the generated reference voltage. The power supplying unit 210 is described in detail in relation to FIG. 3.

The sensor signal processing unit 220 receives a plurality of sensor signals from the environmental sensor unit 100, converts the received sensor signals into voltage type signals, and transfers to the signal converting unit 240.

In detail, the sensor signal processing unit 220 includes a temperature sensor 221, a first sensor converting unit 222, a second sensor converting unit 223, and a third sensor converting unit 224.

The temperature sensor 221 is embedded in the sensor signal processing unit 220 and senses internal and external temperatures. The temperature sensor 221 is described as being embedded internally, but it may be included in the environmental sensor unit 100.

The first sensor converting unit 222 receives a first sensor signal CS1 from the first sensor 110 and converts it into a voltage type signal. In an embodiment, as the first sensor 110 is implemented with a capacitor type sensor, the first sensor converting unit 222 may be implemented with a capacitor-to-voltage converter.

The second sensor converting unit 223 receives a second sensor signal CS2 from the second sensor 120 and converts it into a voltage type signal. In an embodiment, as the second sensor 120 is implemented with a resistor type sensor, the second sensor converting unit 223 may be implemented with a resistor-to-voltage converter.

The third sensor converting unit 224 receives a third sensor signal CS3 from the third sensor 130 and converts it into a voltage type signal. In an embodiment, as the third sensor 130 is implemented with a potential sensor, the third sensor converting unit 222 may be implemented with a programmable gain amplifier (PGA).

The fourth sensor 140 is a voltage type sensor. A fourth sensor signal CS4 sensed by the fourth sensor 140 is not converted into a voltage signal through the sensor signal processing unit 220, but is directly transferred to the signal converting unit 240.

As described above, the sensor signal processing unit 220 includes the temperature sensor 221, the first to third sensor converting unit 222, 223, and 224, but is not limited thereto. In detail, the number of sensor converting units included in the sensor signal processing unit 220 may be determined in correspondence to the number of sensors included in the environmental sensor unit 100.

A clock unit 230 generates a clock signal necessary for driving the sensor signal processing unit 220, the signal converting unit 240, and a digital signal processing unit 250. In detail, the clock unit 230 includes an oscillator 231 and an internal clock generating unit 232.

The oscillator 231 autonomously generates a clock signal and transfers the clock signal to the internal clock generating unit 232 and the digital signal processing unit 250. As the clock signal is generated through the oscillator 231, the number of external elements necessary for driving the ROIC unit 200 may be reduced.

The internal clock generating unit 232 generates an internal clock signal to be transferred to the sensor signal processing unit 220 and the signal converting unit 240 in response to the clock signal. In an embodiment, the internal clock signal may be realized with first and second internal clock signals and may be used as the clock signal necessary for operations of the sensor signal processing unit 220.

The signal converting unit 240 includes an analog-to-digital converting unit 241 and a buffer 242. The analog-to-digital converting unit 241 receives each sensor signal converted into a voltage type signal from the sensor signal processing unit 220. The analog-to-digital converting unit 241 converts each sensor signal of the voltage type into a digital signal in response to the internal clock signal received from the internal clock generating unit 232.

The digital signal processing unit 250 receives the digital signal from the signal converting unit 240. The digital signal processing unit 250 processes the received digital signal in response to the clock signal applied from the clock unit 230. The digital signal processing unit 250 may transfer a processed final digital signal to the I²C 270.

The digital signal processing unit 250 also generates a pulse width modulation (PWM) signal or a pulse duration modulation (PDM) necessary for an operation of a switch unit 260. The pulse width modulation or the pulse duration modulation may be a switching control signal.

The switch unit 260 may adjust an amount of a current applied to each sensor in response to the PWM signal. In detail, each sensor included in the environmental sensor unit 100 (see FIG. 1) allows a heating temperature to be adjusted according to the amount of the current applied through the switch unit 260. According to the heating temperature, an operation of each sensor may be adjusted. For example, as the heating temperature of each sensor increases, the amounts sensed by the sensors may be increased.

The switch unit 260 may be determined in correspondence to the number of sensors included in the environmental sensor unit 100. For example, when the number of the sensors included in the environmental sensor unit 100 is N, the number of switches included in the switch unit 260 becomes N.

However, the existing ROIC is required to transfer a large amount of current through switches, because a current amount necessary for driving sensors is large. However, when the large amount of current is transferred through the switches, much heat is generated and disables operations of sensor signal processing elements. Accordingly, the existing ROIC does not use a scheme of adjusting a current through switches, but uses a scheme of adjusting a current by changing a voltage of a fixed resistor.

Since the ROIC 200 according to an embodiment of the present invention is manufactured to drive the sensors included in the environmental sensor unit 100 with a small amount of current, the current may be adjusted by using the switches 260.

As described above, an average current applied to each sensor may be adjusted through the switch unit 260 operated in response to the PWM signal.

The I²C 270 is connected to peripheral devices such as embedded systems and mobile phones, and transfers the digital signals which are data-processed by the digital signal processing unit 250.

Figure 3:
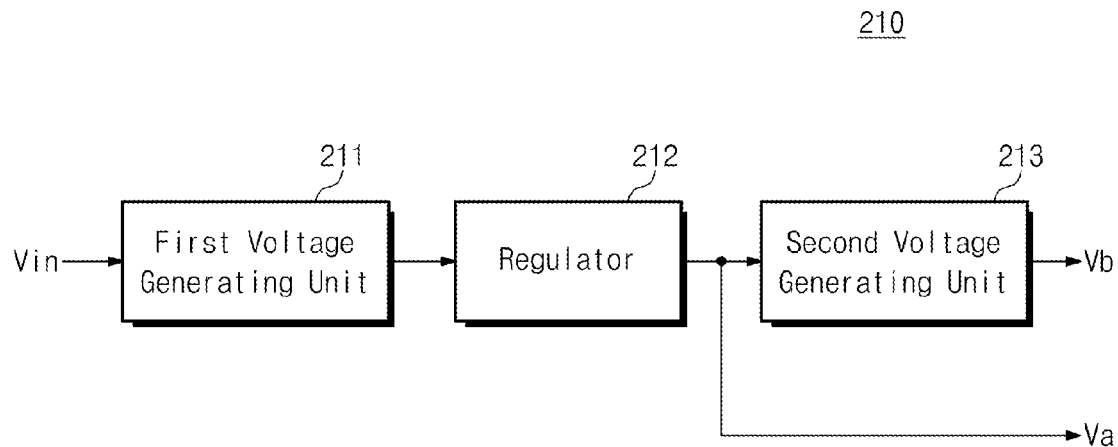
FIG. 3 is a block diagram illustrating the power supplying unit of FIG. 2.

FIG. 3 is a block diagram illustrating a power supplying unit shown in FIG. 2. Referring to FIGS. 2 and 3, the power supplying unit 210 includes a first voltage generating unit 211, a regulator 212, and a second voltage generator 213.

The first voltage generator 211 generates a reference voltage in response to an external power supplying voltage. In an embodiment, the first voltage generator 211 may generate a first bandgap reference signal. Compared to the external power supplying voltage having a wide range voltage level. The first voltage generator 211 converts the reference voltage as a voltage in a constant range. The first voltage generator 211 provides the generated reference voltage to the regulator 212.

The regulator 212 receives a reference voltage and converts it into an internal voltage Va necessary for driving the ROIC 200. The regulator 212 provides the internal voltage Va to components of the ROIC 200 and the second voltage generating unit 213. The components included in the ROIC 200 may be operated in response to the internal voltage Va.

The second voltage generator 213 generates a reference sensing voltage Vb in response to the internal voltage Va. The second voltage generating unit 213 provides the generated reference sensing voltage Vb to the sensor signal processing unit 220. In an embodiment, the reference sensing voltage Vb is provided to the first sensor converting unit 222 included in the sensor signal processing unit 220. The reference sensing voltage Vb may operate as a reference voltage necessary for driving the first sensor converting unit 222.

As described above, the power supplying unit 210 generates reference voltages within a predetermined range according to operations of the first and second voltage generators 211 and 213, and the regulator 212. Thus, the ROIC 200 may be driven with a voltage within a constant range, despite of the external power supplying voltage with a wide range, which varies according to an external environmental change.

Figure 4:
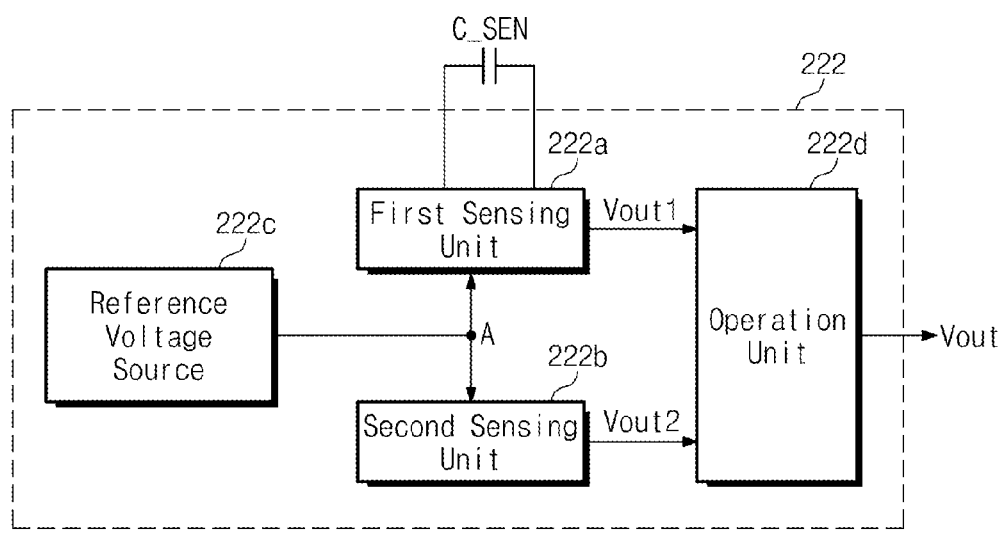
FIG. 4 is a block diagram illustrating a first sensor converting unit of FIG. 2.

FIG. 4 is a block diagram illustrating the first sensor converting unit 222 of FIG. 2. Referring to FIG. 4, the first sensor converting unit 222 includes a first sensing unit 222a, a second sensing unit 222b, a reference voltage source 222c, and an operation unit 222d.

An existing capacitor type sensor signal processing is performed in a scheme that an output voltage is detected by using an integration circuit according to a sensing degree of a capacitor. Thus, in order to process the existing sensor signals, a current source and a clock signal having a precise period are necessary, wherein the current source generates a constant current despite of changes of the external environment and temperature. However, it is not easy to generate the constant current and the precise clock signal despite of the changes of the external environment and temperature.

Accordingly, the first sensor converting unit 222 according to the present invention may be implemented in a switched capacitor structure capable of operating regardless of a clock speed and the external environment. The switched capacitor structure is not affected by conversion of a clock frequency and may be implemented only with capacitors and switches.

The first sensing unit 222a is connected between a reference terminal A and the first sensor 110, which is realized with a capacitor C_SEN, and detects a sensing change amount of the capacitor C_SEN. The first sensing unit 222a may output a first voltage value Vout 1 in response to the sensing change amount of the capacitor C_SEN. In addition, the first sensing unit 222a may operate in response to an internal clock signal which is transferred from the internal clock generating unit 232 (See FIG. 2).

In an embodiment, the internal clock signal is realized with first and second internal clock signals. The first and second clock signals are inverted with respect to each other and operate.

The first voltage value Vout1 may include not only a voltage value according to the sensing change of the capacitor C_SEN, but also noises according to a circuit operation. For example, the noises may be generated on the basis of the circuit operation of the first sensing unit 222a. Accordingly, in order to obtain an accurate output value according to the sensing change of the capacitor C_SEN, it is required to remove the noises included in the first voltage value Vout1.

The second sensing unit 222b, like the first sensing unit 222a, has a switched-capacitor structure including a differential amplifier, a plurality of capacitors, and a switch. The second sensing unit 222b is connected between the first sensing unit 222a and the reference terminal A and may output a second voltage value Vout2 in response to the internal clock signal. In the second voltage value Vout 2, noises on the basis of a circuit operation of the second sensing unit 222b may be also included.

In an embodiment, the second sensing unit 222b may be fabricated in the same structure as the switched-capacitor circuit of the first sensing unit 222a. Accordingly, noises generated on the basis of circuit operations of the second sensing unit 222b may be the same as those generated from the first sensing unit 222a within a predetermined error range.

For example, when the first sensing unit 222a outputs the first voltage value Vout1 and a noise value 'C', the second sensing unit 222b also generates the second output value Vout2 and the same noise 'C'.

The reference voltage source 222c provides a reference sensing voltage to the first and second sensing units 222a and 222b through the reference terminal A. In an embodiment, the reference sensing voltage may be generated from the second voltage generator 213 (see FIG. 3). The first voltage value Vout1 may be adjusted according to the reference sensing voltage, and the second voltage value Vout 2 may be output as the reference sensing voltage. The second sensing unit 222b may be fabricated to output the reference voltage.

The operation unit 222d receives the first and second voltage values Vout1 and Vout 2 and operates them. In an embodiment, the operation nit 222d substrates the second voltage value Vout 2 from the first voltage value Vout1. Accordingly, the operation unit 222d may output a final voltage value Vout of "Vout1-Vout2", in which the noise 'C' is canceled, as a final output value.

Figure 5:
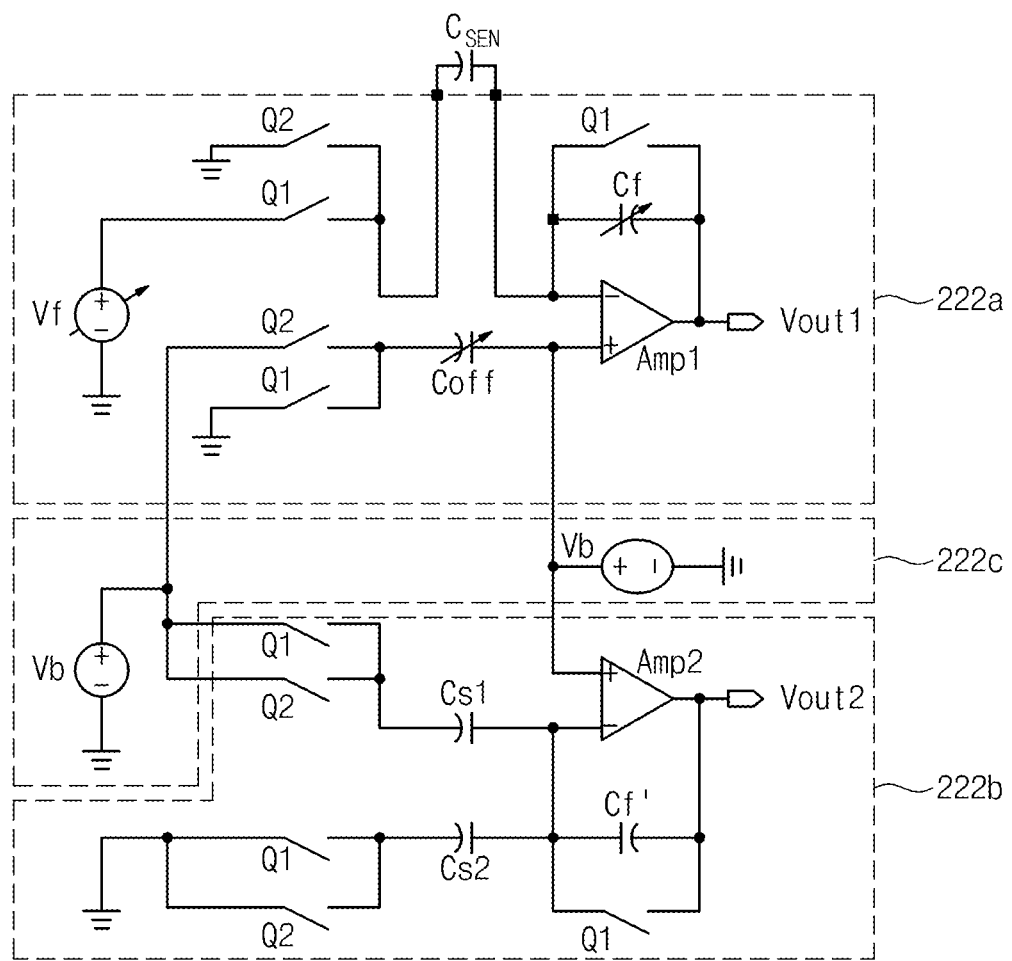
FIG. 5 is a circuit diagram illustrating a first sensor converting unit of FIG. 4.

FIG. 5 is a circuit diagram illustrating the first sensor converting unit of FIG. 4. Referring to FIG. 5, the first sensing unit 222a includes first switches Q1 operating in response to the first internal clock signal and second switches Q2 operating in response to the second internal clock signal. For example, when the first internal clock signal is transitioned from a low level to a high level and the first switches Q1 are turned on, the second internal clock signal is transitioned from a high level to a low level and the second switches Q2 are turned off.

$$Vout1=(C\_SEN/Cf)*Vf+(Coff/Cf-1)*Vb \qquad (1)$$

The first sensing unit 222a may output the first voltage value Vout1 through a first differential amplifier Amp1 in response to the amount of sensing change of the capacitor C_SEN. With reference to the above-described equation 1, the first sensing unit 222a may output the first voltage value Vout1 in correspondence to a variable capacitor Cf, a variable voltage source Vf, and an offset capacitor Coff.

In detail, the first voltage value Vout1 may be adjusted according to a voltage level of the variable voltage source Vf, and gain controls by the capacitor C_SEN and the variable capacitor Cf. Also, the first voltage value Vout 1 may be adjusted according to the reference voltage Vb and gain controls by the offset capacitor Coff and the variable capacitor Vf. A voltage value according to the reference voltage Vb and the gain controls by the offset capacitor Coff and the variable capacitor Vf may be a DC level of the first voltage value Vout1.

The second sensing unit 222b, like the first sensing unit 222a, includes first switches Q1 operating in response to the first internal clock signal and second switches Q2 operating in response to the second internal clock signal. As the second sensing unit 222b is implemented identically to a circuit structure of the first sensing unit 222a, the same noise is generated within a predetermined error range as that occurring according to an internal element of a circuit of the first sensing unit 222b.

As described above, the second sensing unit 222b outputs the second voltage value Vout2 through a second differential amplifier Amp2 in response to the reference sensing voltage Vb which is applied from the reference voltage source 222c. In an embodiment, the second sensing unit 222b outputs the reference sensing voltage Vb as the second voltage value Vout2.

In an embodiment, the first and second capacitors Cs1 and Cs2 included in the noise sensing unit 222b, and the second differential amplifier Amp2 may be implemented smaller than capacitors included in the signal sensing unit 222a and the first differential amplifier Amp1. Accordingly, power consumption may be reduced, and an entire size of the ROIC 200 (see FIG. 2) may become smaller.

As described above, since the first and second sensing units 222a and 222b are implemented in the same circuit structure, noises generated on the basis of circuit operations of each sensing unit can be canceled with each other. Also, in FIG. 5, the operation unit 222d (see FIG. 4) is assumed as being omitted.

Accordingly, those of ordinary skilled in the art will recognize that various changes and modifications of the embodiments described herein can be made without departing from the scope and spirit of the invention.

According to embodiments, a sensor signal processing device is implemented with a single element and processes output signals from a plurality of sensors. Accordingly, entire power consumption in a ROIC including the sensor signal processing circuit can be reduced.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A readout integrated circuit (ROIC) comprising:
   a sensor signal processing unit receiving sensor signals from a plurality of sensors and converting respectively the sensor signals into voltage signals;
   a signal converting unit respectively converting the voltage signals into digital signals;
   a digital signal processing unit outputting digital signals processed in response to the voltage signals and a switching control signal;
   a power supplying unit generating an internal voltage for operating the signal converting unit and the digital signal processing unit, and a reference sensing voltage for operating the sensor signal processing unit; and
   a switch unit including switches corresponding respectively to the plurality of sensors and adjusting an amount of a current applied to each sensor in response to the switching control signal.

2. The ROIC of claim 1, wherein the power supplying unit comprises:
   a first voltage generating unit generating a reference voltage in response to an external power supplying voltage;
   a regulator generating the internal voltage in response to the reference voltage;
   a second voltage generating unit generating the reference sensing voltage in response to the internal voltage.

3. The ROIC of claim 1, wherein the sensor signal processing unit comprises a plurality of sensor converting units, wherein at least any one of the plurality of sensor converting units is a capacitor type sensor converting unit.

4. The ROIC of claim 3, further comprising a clock unit generating an internal clock signal for allowing the capacitor sensor converting unit to operate.

5. The ROIC of claim 4, wherein the clock unit comprises:
   an oscillator generating a clock signal; and
   an internal clock generator generating the internal clock signal in response to the clock signal.

6. The ROIC of claim 3, wherein the sensor signal processing unit comprises a temperature sensor.

7. The ROIC of claim 1, further comprising an inter-integrated circuit (I²C) transferring the signal-processed digital signal output from the digital signal processing unit to an external circuit.

8. The sensor signal processing apparatus of claim 1, wherein the switching control signal is an ON or OFF type signal.

9. The sensor signal processing apparatus of claim 1, wherein the switching control signal is a pulse width modulation (PWM) signal type or a pulse duration modulation (PDM) type signal.

* * * * *